United States Patent Office 3,413,353
Patented Nov. 26, 1968

3,413,353
2-(4-TRIFLUOROMETHYLPHENYL)-
INDAN-1,3-DIONES
Wybe T. Nauta, 233 Nieuw Loosdrechtsedijk,
Nieuw Loosdrecht, Netherlands
No Drawing. Filed Aug. 25, 1965, Ser. No. 482,617
Claims priority, application Great Britain, Aug. 27, 1964,
35,212/64
6 Claims. (Cl. 260—590)

ABSTRACT OF THE DISCLOSURE

New compounds are provided which have the formula

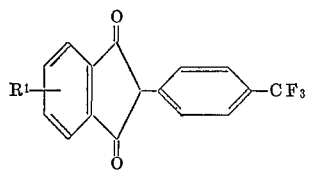

wherein $R^1$ is hydrogen, halogen, alkyl, nitro or alkoxy. The new compounds may be prepared by reaction of a phthalic containing the appropriate $R^1$ substituent with p-trifluoromethyl benzaldehyde. The new compounds may also be obtained by treatment of a p-trifluoromethylbenzilidine-$R^1$-substituted phthalide with an alkali metal alkoxide and also by reaction of an $R^1$ substituted dialkylphthalate with an akyl ester of p-trifluoromethylphenylacetic acid.

This invention relates to a new therapeutically useful phenyl-indandiones, to processes for their preparation and to pharmaceutical compositions containing them.

According to the present invention, there are provided the new 2-(4-trifluoromethylphenyl)-indan-1,3-diones of the formula:

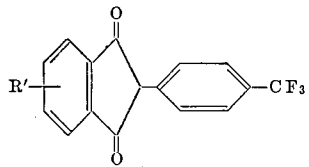

(I)

wherein R′ represents a hydrogen or halogen atom, or an alkyl, nitro or alkoxy group. It is to be understood that in the present specification and claims all occurrences of the words "alkyl" and "alkoxy" mean alkyl and alkoxy groups respectively having straight or branched chains, containing not more than 6 carbon atoms. The aforesaid indan-1,3-diones are therapeutically useful, possessing anti-coagulant properties. The compound wherein R′ represents a hydrogen atom is the preferred one.

According to a feature of the invention, the compounds of Formula I are prepared by the process which comprises reacting a phthalide of the formula:

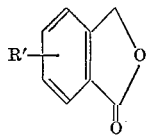

(II)

(wherein R′ is as hereinbefore defined) with p-trifluoromethylbenzaldehyde of the formula:

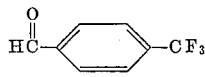

(III)

in the presence of an alkali alkoxide of the formula $MOR^2$, wherein $R^2$ represents an alkyl group and M represents an alkali metal, preferably a sodium atom. The reaction is preferably carried out using an excess of the alkali metal alkoxide and in the presence of a water-binding substance, preferably an organic ester, for example ethyl propionate.

A preferred method of preparing the p-trifluoromethylbenzaldehyde used as a starting material is by the reaction of p-trifluoromethylchlorobenzene, a commercially available compound, with cuprous cyanide and converting the cyano group of the resultant p-trifluoromethylcyanobenzene to an aldehyde group under the conditions of the Stephen reaction as described in a publication by H. C. Brown and C. P. Garg in Journal of the American Chemical Society, J. Am. Chem. Soc. 86, 1085 (1964). The procedure is shown by the following reaction scheme:

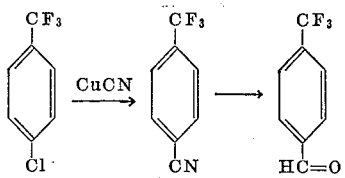

An alternative, though, because of the relatively numerous steps involved, generally less preferred method of preparing the p-trifluoromethylbenzaldehyde is by the reaction of p-trifluoromethylbenzoyl chloride with anhydrous ethanol, reduction of the resultant ethyl ester of p-trifluoromethylbenzoic acid, preferably with lithium aluminum hydride, reaction of the resultant benzyl alcohol with hydrobromic acid, preferably in the presence of concentrated sulphuric acid, and reaction of the resultant p-trifluoromethylbenzyl bromide with sodium ethoxide and 2-nitropropane. The procedure is shown by the following reaction scheme:

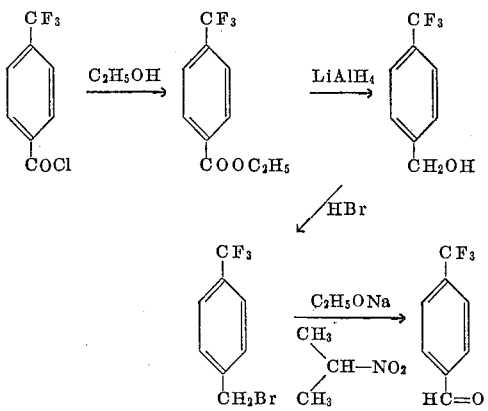

According to another feature of the invention, the compounds of Formula I are prepared by the process which comprises reacting a benzylidene-phthalide of the formula:

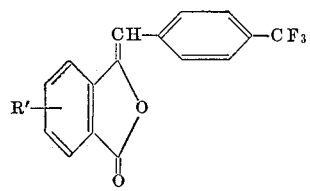

(IV)

wherein R′ is as hereinbefore defined with an alkali metal alkoxide $MOR^2$, wherein $R^2$ and M are as hereinbefore defined, and decomposing the resultant alkali metal salt by treatment with dilute acid, which may be an inorganic non-oxidizing acid, e.g. hydrochloric acid, or an organic acid, e.g. acetic acid. The reaction is preferably carried out by boiling under reflux a solution of a compound of Formula IV in an alcohol of the formula $R^2OH$ with an equivalent amount of the alkali metal, preferably sodium alkoxide. The alcohol is removed by distillation and, after cooling, the residue is dissolved in cold water. The desired compounds of Formula I art precipitated upon acidification of the obtained orange-red solution of their alkali metal salts, preferably the acidification is not taken below pH 2.

The starting materials of Formula IV can be prepared according to Perkins synthesis, viz, an appropriately substituted phthalic acid anhydride is reacted with p-trifluoromethyl-phenylacetic acid in the presence of anhydrous sodium acetate, which acts as a catalyst. The reaction is preferably carried out by melting the substances together.

According to still another feature of the invention, the compounds of Formula I are prepared by the process which comprises reacting a dialkylphthalate of the formula:

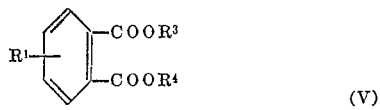

(V)

wherein $R^1$ is as hereinbefore defined and $R^3$ and $R^4$ are each an alkyl group, with a trifluoromethylphenylacetic acid alkyl ester of the formula:

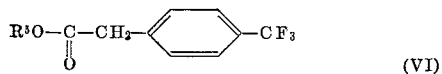

(VI)

wherein $R^5$ is an alkyl group in the presence of an alkali metal (preferably sodium) alkoxide $MOR^2$ wherein $R^2$ and M are as hereinbefore defined. The reaction is preferably carried out by boiling under reflux for at least 12 hours a compound of Formula V with a compound of Formula VI dissolved in an anhydrous inert organic solvent, for example, toluene, in the presence of the alkali metal alkoxide and, after cooling, decomposing the resultant complex with water. After extraction of the organic layer with diethyl ether the compounds of Formula I are precipitated with a dilute acid, for example hydrochloric acid.

The following example, in which the temperatures mentioned are in degrees centigrade, the percentage yields mentioned are related to the theoretical yield and all percentages are by weight, illustrates the preparation of compounds of the invention.

EXAMPLE

There are dissolved in 30 ml. of anhydrous ethyl propionate, with gentle heating, 6.4 g. of p-trifluoromethylbenzaldehyde and 5.0 g. of phthalide. There is then added a solution of sodium methoxide in methyl alcohol, prepared by dissolving 2.6 g. of sodium in 40 ml. of methyl alcohol. The mixture is boiled under reflux for 6 hours under a nitrogen atmosphere. The methyl alcohol is removed by distillation and, after cooling, the residue is dissolved in cold water. The aqueous layer is extracted three times with 100 ml. of diethyl ether, and then acidified with 4 N sulphuric acid, whereupon a dark violet substance precipitates. The impure product is crystallized from methanol yielding 9.2 g. (86%) of 2-(4-trifluoromethylphenyl)-indan-1,3-dione, melting point 177–184°

*Analysis.*—Calculated for $C_{16}H_9O_2F_3$: C, 66.21%; H, 3.12%; F, 19.64%. Found;: C, 66.1%; H, 3.1%; F, 19.5%.

p-Trifluoromethylbenzaldehyde used as starting material is prepared as follows:

(a) To a mixture of 10 ml. of dry pyridine and 30 ml. of anhydrous ethyl alcohol there are added 19.6 g. of p-trifluoromethylbenzoyl chloride. The mixture is then boiled under reflux for 3½ hours. After cooling, 100 ml. of water are added and the mixture is extracted with 3 portions of 50 ml. of diethyl ether. The ether layer is washed with 25 ml. of a 10% solution of sodium bicarbonate and then twice with 25 ml. of water. The ether layer is dried with magnesium sulphate and filtered. The ether is removed by distillation. The residue is subjected to distillation under reduced pressure. There is obtained 18.4 g. (yield 89.8%) of ethyl p-trifluoromethyl-benzoate: boiling point 98.5–99.5° at a pressure of 16 mm. of Hg; $n_d^{20}$ (refractive index at 20° C.)=1.4481.

(b) A solution of 18.4 g. of the ethyl p-trifluoromethylbenzoate in 25 ml. of anhydrous diethyl ether is added dropwise to a mixture of 2.3 g. of lithium aluminum hydride and 50 ml. of anhydrous diethyl ether, the rate of addition being such that the mixture keeps refluxing. After the addition is completed, boiling is continued for 45 minutes. The excess lithium aluminum hydride is decomposed with ethyl acetate and then with about 10 ml. of water. Immediately after that, 60 ml. of 6 N sulphuric acid are added as quickly as possible and stirring is continued until the layers are clear again. The ether layer is separated off, and the aqueous layer extracted twice with 25 ml. of diethyl ether. The combined ether layers are washed with sodium bicarbonate and then with water until the ethereal solution is neutral. The ethereal solution is dried with magnesium sulphate, the ether removed by distillation and the residue distilled under reduced pressure. There is obtained 13.9 g. (yield 93.7%) of p-trifluoromethylbenzyl alcohol: boiling point 107° at a pressure of 18 mm. of Hg; $n_d^{20}$=1.4605.

(c) A mixture of 13.9 g. of the p-trifluoromethylbenzyl alcohol, 44 g. of 48% concentration aqueous hydrobromic acid and 6.5 ml. of concentrated sulphuric acid is boiled under reflux for 6 hours. After cooling, the mixture is extracted with petroleum ether (boiling range 28–40°). The extract is washed twice with concentrated sulphuric acid (20 ml.) to remove the excess alcohol, subsequently washed with 25 ml. of a 10% solution of sodium bicarbonate and then with water until neutral to litmus. The extract is dried with magnesium sulphate and filtered; the petroleum ether is removed by distillation and the residue is distilled under reduced pressure. There is obtained 16.7 g. (yield 88.4%) of p-trifluoromethylbenzyl bromide: boiling point 91–92° at a pressure of 18 mm. of Hg; $n_d^{20}$=1.4922.

(d) To a solution of 0.92 g. of sodium in 52 ml. of anhydrous ethyl alcohol is added 3.9 g. of 2-nitropropane and 9.5 g. of the p-trifluoromethylbenzyl bromide. There is formed a thick gel-like substance, that cannot be stirred on account of the formed sodium salt of 2-nitropropane. After about two hours the mixture becomes less viscous and a solid white precipitate of sodium bromide is formed. The mixture is heated for about two hours at a temperature of 30–35° whereupon the liquid becomes clear again. The mixture is filtered and the alcohol removed by distillation. The residue is dissolved in 10 ml. of diethyl ether and 15 ml. of water. The ether layer is washed twice with 5 ml. of a 10% sodium hydroxide solution and then twice with 5 ml. of water. The ether layer is dried with magnesium sulphate, filtered and concentrated by evaporation of the solvent. The residue is subjected to distillation under reduced pressure. There is obtained 4.6 g. (yield 66.5%) of p-trifluoromethylbenzaldehyde: boiling point 66–68° at a pressure of 14 mm. of Hg; $n_d^{20}$=1.4634.

There may also be prepared by the procedure of the foregoing example, using appropriate phthalide starting materials of Formula II, other products within the scope of general Formula I, for example 2-(4-trifluoromethylphenyl)-5-propyl-indan-1,3-dione,
2-(4-trifluoromethylphenyl)-4-chloro-indan-1,3-dione,
2-(4-trifluoromethylphenyl)-4-methoxy-indan-1,3-dione,
2-(4-trifluoromethylphenyl)-5-isobutyl-indan-1,3-dione,
2-(4-trifluoromethylphenyl)-5-nitro-indan-1,3-dione,
2-(4-trifluoromethylphenyl)-4-methyl-indan-1,3-dione.

The invention includes within its scope pharmaceutical compositions containing, as active ingredient, at least one of the therapeutically active compounds of general Formula I in association with a pharmacologically acceptable carrier. The preparations may take any of the forms customarily employed for administration of therapeutically active substances, but the preferred types are those suitable for oral administration and especially tablets, pills, and capsules containing the substance. The tablets and pills may be formulated in the usual manner with one or more pharmacologically acceptable diluents or excipients, for example lactose or starch, and include materials of a lubricating nature, for example calcium stearate. Capsules made of absorbable material such as gelatin, may contain the active substance alone or in admixture with a solid or liquid diluent. Liquid preparations may be in the form of suspensions, emulsions, syrups or elixirs of the active substance in water or other liquid medium commonly used for making orally-acceptable pharmaceutical formulations, such as liquid paraffin, or a syrup or elixir base. The active substance may also be made up in a form suitable for parenteral administration, i.e., as a suspension in sterile water or an organic liquid usually employed for injectable preparations, for example a vegetable oil such as olive oil, or a sterile solution in an organic solvent.

What I claim and desire to secure by Letters Patent is:
1. 2-(4-trifluoromethylphenyl)-indan-1,3-diones of the formula:

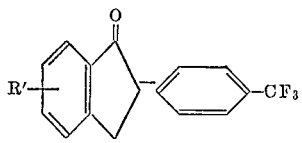

wherein R' is selected from the group consisting of hydrogen chlorine, alkyl of not more than six carbon atoms, nitro and alkoxy of not more than six carbon atoms.
2. 2-(4-trifluoromethylphenyl)-indan-1,3dione.
3. 2-(4-trifluoromethylphenyl)-indan-1,3-diones of the formula defined in claim 1 wherein said R' is chlorine.
4. 2-(4-trifluoromethylphenyl)-indan-1,3-diones of the formula defined in claim 1 wherein said R' is alkyl of not more than six carbon atoms.
5. 2-(4-trifluoromethylphenyl)-indan-1,3-diones of the formula defined in claim 1 wherein said R' is nitro.
6. 2-(4-trifluoromethylphenyl)-indan-1,3-diones of the formula defined in claim 1 wherein said R' is alkoxy of not more than six carbon atoms.

References Cited
UNITED STATES PATENTS

| | | | |
|---|---|---|---|
| 2,310,949 | 2/1943 | Ford et al. | 260—590 |
| 2,672,483 | 3/1954 | Thomas | 260—590 |
| 2,827,489 | 3/1958 | Birkenmeyer et al. | 260—590 |
| 3,090,813 | 5/1963 | Geiger et al. | 260—590 |

OTHER REFERENCES
Koelsch, J. Am. Chem. Soc. 58, 1331–1333 (1936).
Koelsch, J. Am. Chem. Soc. 58, 1328–1330 (1936).
Horton et al., J. Org. Chem. 25, 938–941 (1960).

DANIEL D. HORWITZ, *Primary Examiner.*